US012152755B1

(12) United States Patent
Hwang (10) Patent No.: US 12,152,755 B1
(45) Date of Patent: Nov. 26, 2024

(54) OUTDOOR SOLAR DISC LAMP (71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/321,065

(22) Filed: May 22, 2023

(51) Int. Cl.
| F21S 8/08 | (2006.01) |
| F21S 9/03 | (2006.01) |
| F21V 21/08 | (2006.01) |
| F21V 31/00 | (2006.01) |
| F21W 131/10 | (2006.01) |

(52) U.S. Cl.
CPC .............. *F21S 8/081* (2013.01); *F21S 9/037* (2013.01); *F21V 21/0824* (2013.01); *F21V 31/005* (2013.01); *F21W 2131/10* (2013.01)

(58) Field of Classification Search
CPC ....... F21S 8/081; F21S 9/037; F21V 21/0824; F21V 31/005; F21W 2131/10

USPC ......................................................... 362/157
See application file for complete search history.

(56) References Cited

U.S. PATENT DOCUMENTS

| 10,619,810 | B1 * | 4/2020 | Hwang | ................... | F21S 9/037 |
| 11,333,333 | B1 | 5/2022 | Hwang | | |
| 11,448,374 | B2 | 9/2022 | Xiong | | |

FOREIGN PATENT DOCUMENTS

AU         2022204883 A1    2/2023

* cited by examiner

*Primary Examiner* — Elmito Breval
*Assistant Examiner* — Hana S Featherly (57) ABSTRACT

An outdoor solar disc lamp includes a translucent lampshade mounted on a base, the translucent lampshade has a top translucent portion and a side translucent portion around the periphery of the top translucent portion, a solar panel is installed between the base and the translucent lampshade and above a battery, and a circular light panel surrounds the periphery of the battery and has a height lower than the solar panel, such that the circular light panel can emit light toward both the top translucent portion and the side translucent portion of the translucent lampshade.

14 Claims, 8 Drawing Sheets

OUTDOOR SOLAR DISC LAMP

TECHNICAL FIELD OF THE DISCLOSURE

The present disclosure relates to an outdoor solar disc lamp, and more particularly to a lamp that can be plugged into an outdoor ground or fixed to any surface and includes a built-in solar panel that illuminates the surroundings of the top and four sides without requiring any external power supply.

DESCRIPTION OF RELATED ART

Outdoor lights are often used in gardens, homes, open-air restaurants or outdoor leisure venues to provide moderate lighting, and to create an atmosphere and decorate the surrounding environment. For example, a substantially disc-shaped ground light commercially available on the market is buried in the ground, and capable of emitting light from the top, the side, or the bevel of the ground light, but there is still no lamp product that emits light from both the top surface and the sides.

In view of the limited illumination range of outdoor solar lamps, existing technologies have designed outdoor solar lamps with light emission from both the top surface and oblique angles, for example, a solar lamp disclosed in U.S. Pat. No. 11,448,374 is equipped with a plurality of inclined light guides around a disc-shaped lampshade, so that a main lamp panel can direct light to the surrounding area by the inclined light guides in addition to the top surface. However, each light guide of U.S. Pat. No. 11,448,374 has a certain length and a divergent angle, so that the side light guide effect is not good, and the volume of the overall solar outdoor light increases, which is not conducive to packaging and transportation.

For the above reasons, the present discloser has designed the U.S. Pat. No. 11,333,333B1, and the Australian Patent No. 2022204883A1 entitled "OUTDOOR SOLAR GROUND LIGHT", aiming at providing a plurality of secondary light boards in the peripheral space at the bottom of the primary light board of the outdoor solar lamp, so that the light of the primary and secondary light boards can be scattered towards the side, and the light of the primary and secondary light boards can penetrate the top and side surfaces of the lampshade respectively. The primary and secondary light boards can be directed to the side, so that the light from the primary and secondary light boards can penetrate the top and the side of the lampshade respectively, thereby further enhancing the side lighting effect.

The present discloser based on continuous research on the function of outdoor lighting products to improves over the U.S. Pat. No. 11,333,333B1 so that the outdoor lighting can provide top and side luminous effects without the need for a secondary light board, thereby achieving the purpose of easy assembly and reduced production costs.

SUMMARY OF THE DISCLOSURE

Specifically, the present disclosure is an outdoor solar disc lamp, including: a translucent lampshade, having a top translucent portion, and a side translucent portion extended downwardly from the periphery of the top translucent portion, wherein the side translucent portion has a bottom and an inner side;
  a base, comprising an accommodating slot formed at the center of the base, the accommodating slot having a bottom surface provided for installing a group of positioning components, such that the base can be fixed to the ground or a plane through the positioning component; a circular fixed portion extended outwardly from the periphery of the accommodating slot, and having an outer ring provided for fixing the bottom of the side translucent portion of the translucent lampshade, and the fixed portion comprising a fixed platform disposed at a position between the outer ring and the accommodating slot;
  a battery, installed in the accommodating slot, and having a partition disposed above the battery, and a height higher than the fixed platform of the fixed portion of the base; a solar panel, installed on the partition of the battery, and disposed under the center of the top translucent portion of the translucent lampshade, and the periphery of the solar panel and an inner side of the side translucent portion having a spacing; and
  a circular light panel, electrically coupled to the solar panel and the battery, and fixed onto the fixed platform and between an inner side of the side translucent portion and the accommodating slot, and the circular light panel having a height lower than the solar panel, and the circular light panel comprising a plurality of LEDs thereon, such that when the plurality of LEDs emits light, the light of the LEDs upwardly passes through the spacing between the solar panel and the side translucent portion and penetrates through the top translucent portion of the translucent lampshade and diffuses toward the top and laterally passes through the side translucent portion of the translucent lampshade and diffuses toward the surrounding.

Compared with the related art, the present disclosure improved over the disclosed U.S. Pat. No. 11,333,333B1, so that the outdoor lamp does not need to set up a secondary light panel but fixes the circular light panel around the lower part of the solar panel and at a position between the inner side of the side translucent portion and the accommodating slot, such that the LEDs on the same circular light panel can provide the luminous effect to both the top and the side, thereby achieving the effects of easy assembly and reduced production cost.

The technical characteristics of this disclosure will become apparent with the detailed description of preferred embodiments accompanied with the illustration of related drawings

DETAILED DESCRIPTION OF THE DISCLOSURE

Figure 1:
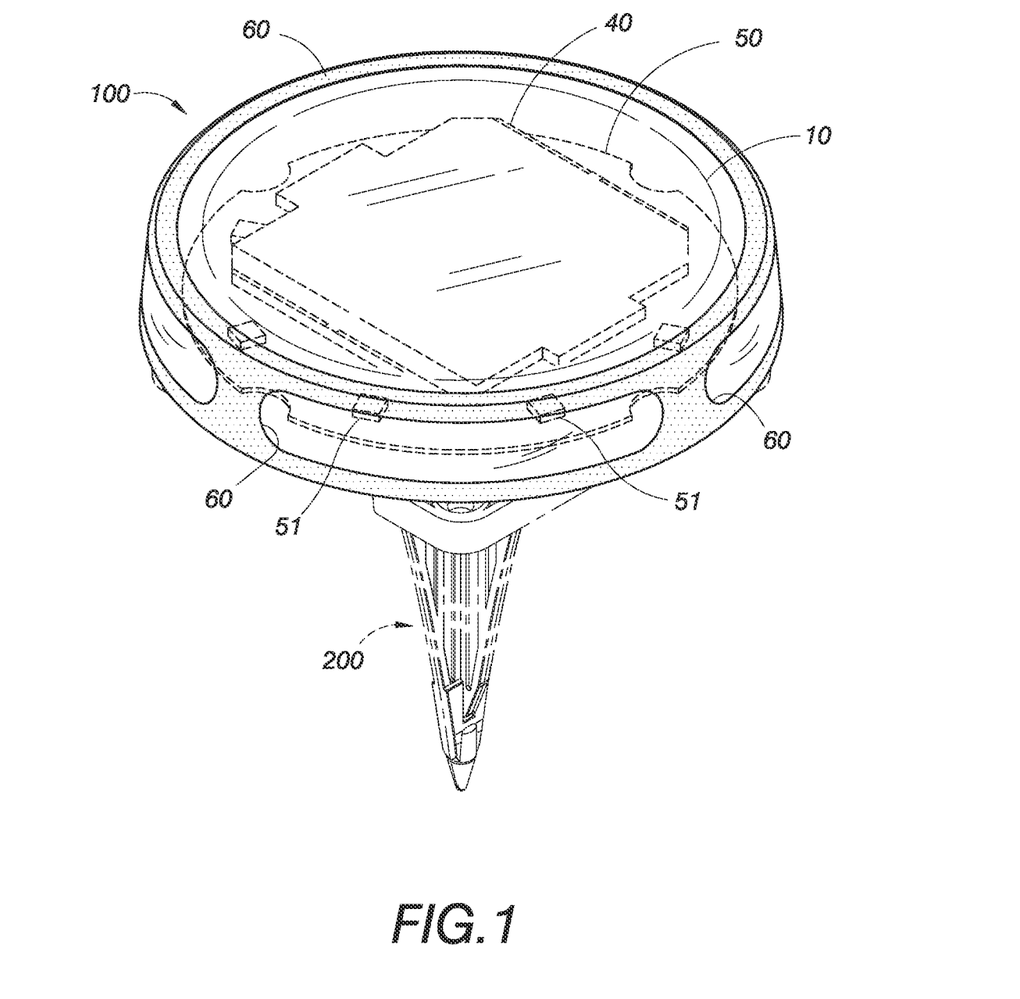
FIG. 1 is a perspective view of this disclosure.
Figure 2:
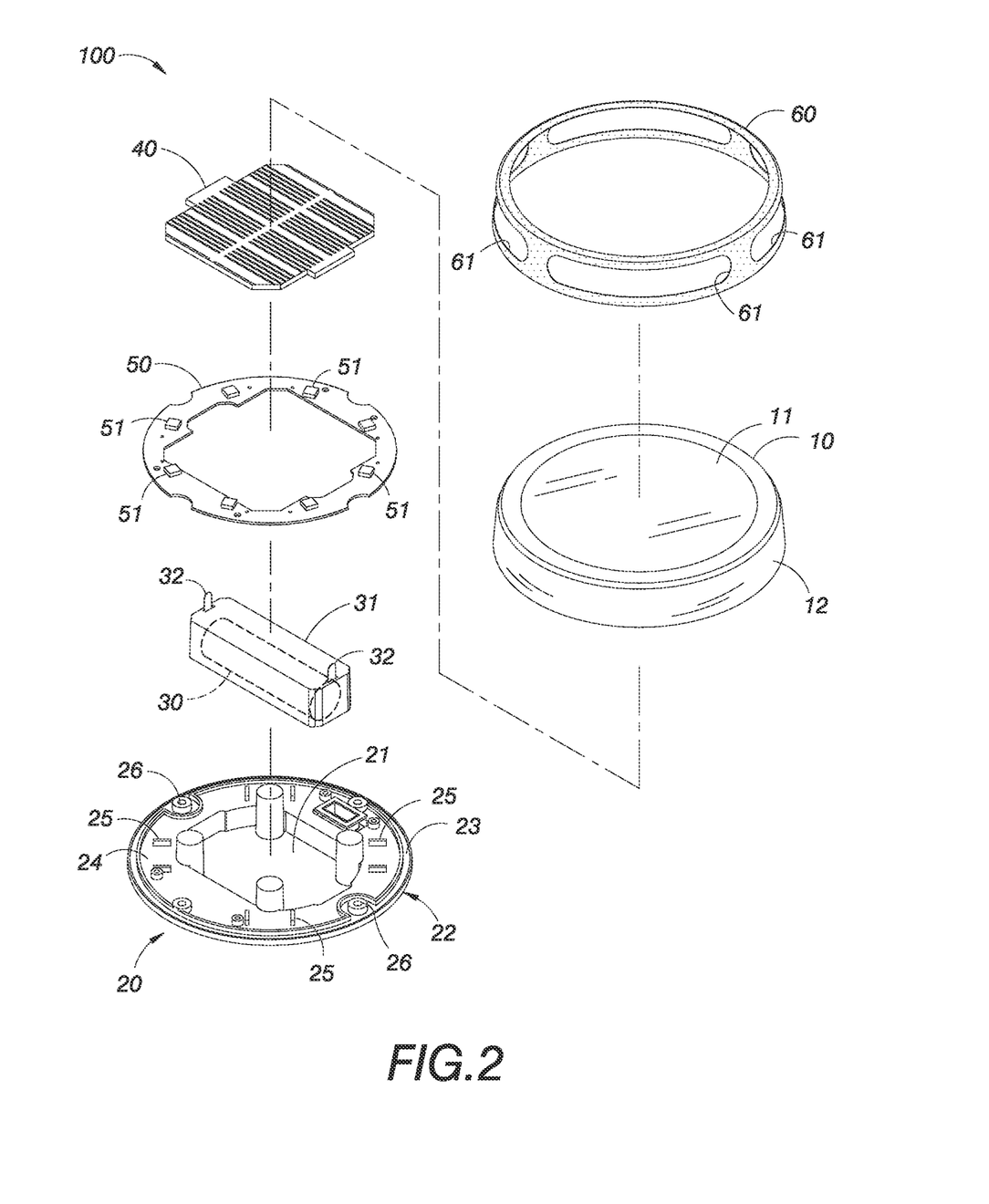
FIG. 2 is an exploded view of the present disclosure.
Figure 3:
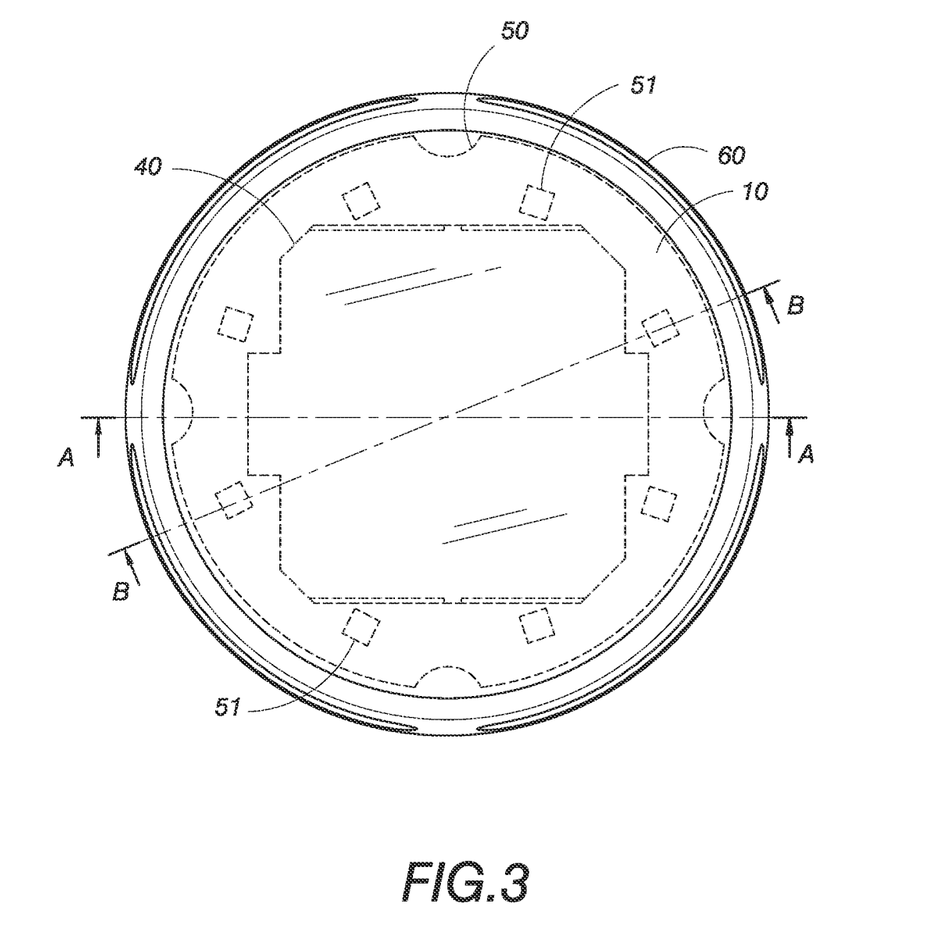
FIG. 3 is a top view of the present disclosure.

With reference to FIGS. 1 and 2 for an outdoor solar disc lamp in accordance with the present disclosure, the outdoor solar disc lamp 100 includes a translucent lampshade 10, a base 20, a battery 30, a solar panel 40, and a circular light panel 50.

In FIGS. 2 to 5, the translucent lampshade 10 includes a top translucent portion 11, and a side translucent portion 12 downwardly extended from the periphery of the top translucent portion 11, a frame 60 installed around the outer periphery of the top translucent portion 11, and a plurality of translucent holes 61 downwardly extended from the outer periphery of the of the frame 60 to the outer side 121 of the side translucent portion 12 and configured to be corresponsive to the side translucent portion 12.

The base 20 includes an accommodating slot 21 formed at the center of the base 20, a circular fixed portion 22 outwardly extended from the periphery of the accommodating slot 21 and having an outer ring 23 for fixing the bottom 122 of the side translucent portion 12 of the translucent lampshade 10, and a fixed platform 24 formed between the outer ring 23 and the accommodating slot 21.

The battery 30 is installed in the accommodating slot 21 and has a partition 31 disposed above the battery 30, and the height of the partition 31 is higher than the fixed platform 24 on the fixed portion 22 of the base 20.

The solar panel 40 is installed on the partition 31 of the battery 30 and disposed under the center of the top translucent portion 11 of the translucent lampshade 10, and the periphery of the solar panel 40 and the inner side 123 of the side translucent portion 12 have a spacing D, and the top translucent portion 11 of the translucent lampshade 10 has an embossed line 13 opposite to the spacing D for refracting light.

The circular light panel 50 is electrically connected to the solar panel 40 and the battery 30, fixed on the fixed platform 24 of the base 20, and disposed between the inner side 123 of the side translucent portion 12 and the accommodating slot 21 and under the spacing D. The fixed platform 24 has a plurality of positioning ribs 25 protruded from the fixed platform 24 and provided for positioning the circular light panel 50.

The height of the circular light panel 50 is lower than the solar panel 40, and the circular light panel 50 has a plurality of LEDs 51. When the plurality of LEDs 51 emits light, the light can upwardly pass through the spacing D between the solar panel 40 and the side translucent portion 12 and penetrates through the top translucent portion 11 of the translucent lampshade 10 to enable the light emitted by the LED 51 to pass through the embossed line 13 and then uniformly diffuse toward the top, while the light can laterally pass through the side translucent portion 12 of the translucent lampshade 10 to diffuse toward the surrounding, so as to enable the light emitted by the LEDs 51 of the same circular light panel 50 to provide light to both the top and the side, and achieve the effects of easy assembly and reduced production cost.

The implementation modes of the components of the present disclosure are described in details below:

In an embodiment as shown in FIG. 2, the accommodating slot 21 at the center of the base 20 is in a concave recessed shape, the battery 30 is stacked in the accommodating slot 21, and the fixed portion 22 is formed by extending the upper edge of the recessed accommodating slot 21 to the surrounding. In FIG. 2, the periphery of the partition 31 is downwardly extended to cover the periphery of the battery 30, and the partition 31 has a plurality of terminals 32 electrically connected to the circular light panel 50, the battery 30 and the solar panel 40.

In the embodiment, the battery may also be placed in a battery slot, and the battery slot is set in the accommodating slot of the base and disposed at the center of the base, and its top surface constitutes the partition, such that the partition has the same height with the fixed platform of the base and is provided for installing a solar panel.

Figure 6:
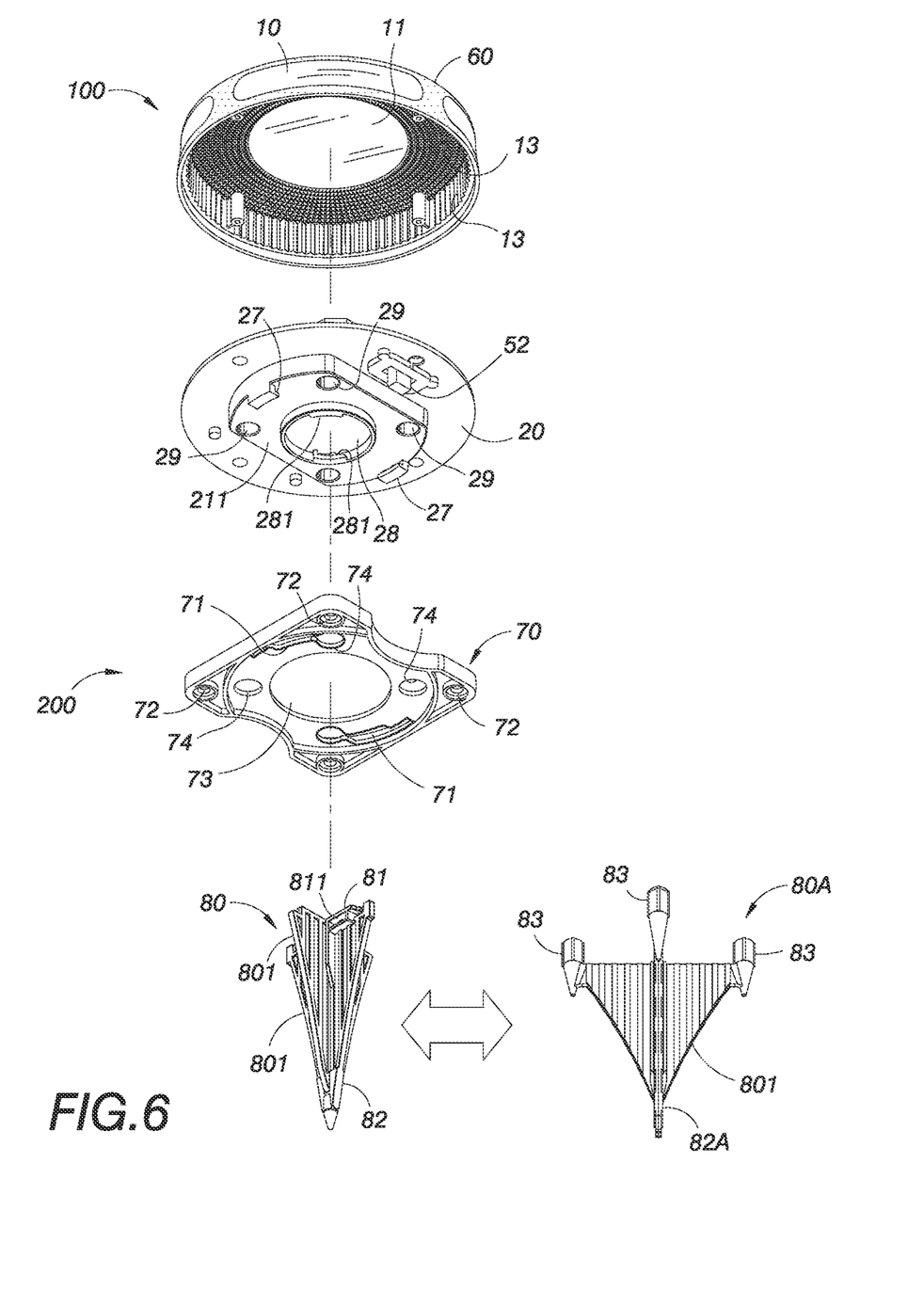
FIG. 6 is an exploded view of the present disclosure viewing from a bottom view perspective position.

In FIGS. 2 and 6, the base 20 includes a switch 52 installed on another side opposite to the fixed platform 24 and electrically connected to the switch 52 and the circular light panel 50. The switch 52 is provided for users to press or toggle to switch the lighting effect of the circular light panel 50. For example, after a user presses or toggles the switch 52, it can switch to white light or RGB Color to let users have more options for the lighting effect.

Figure 4:
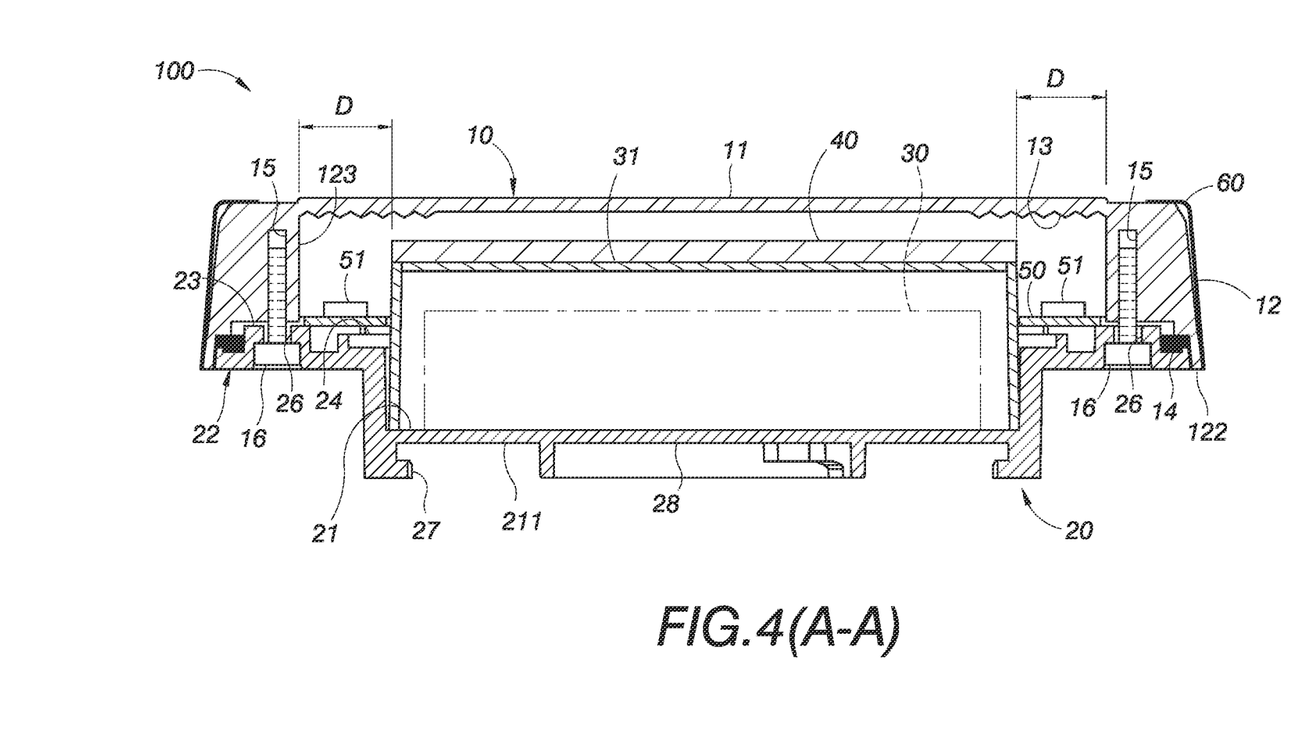
FIG. 4 is a cross-sectional view of Section A-A of FIG. 3.
Figure 5:
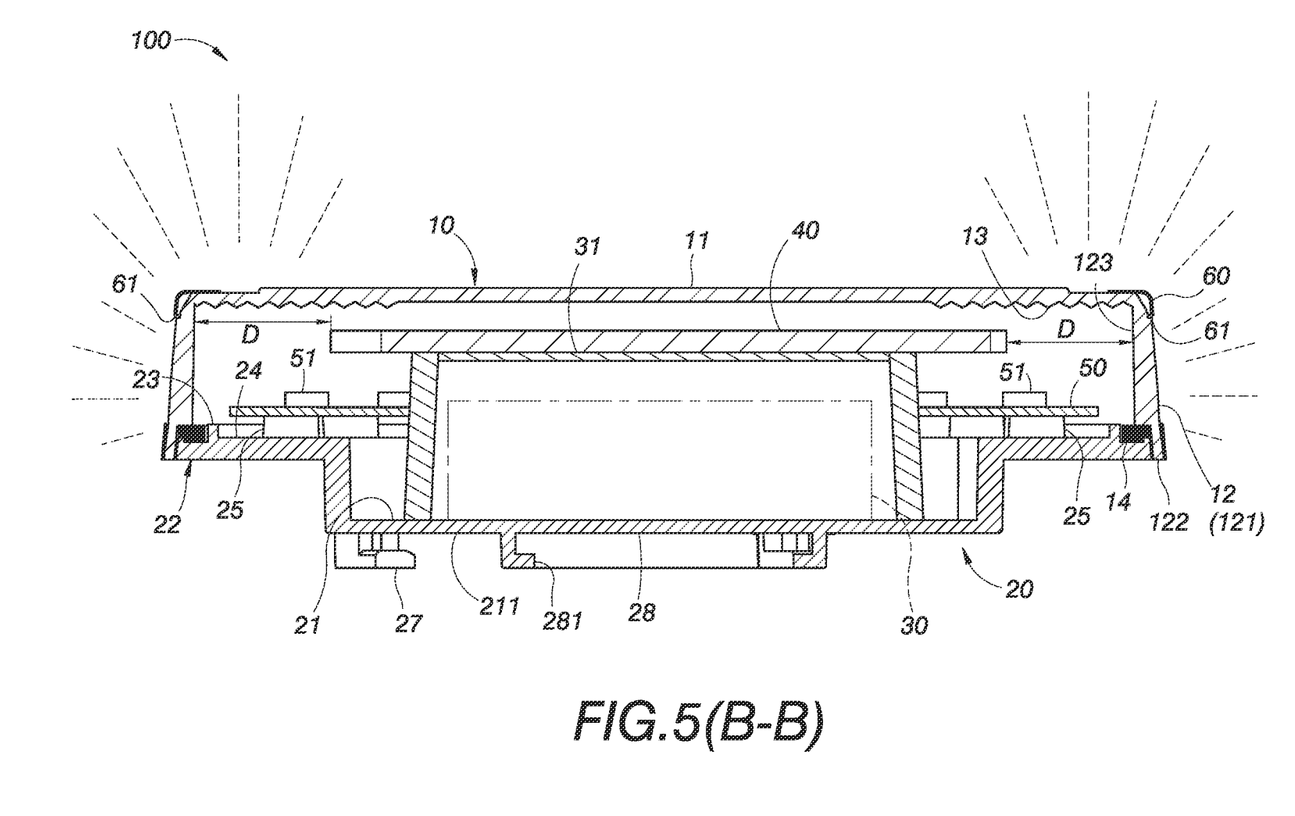
FIG. 5 is a cross-sectional view of Section B-B of FIG. 3.

In FIGS. 4 and 5, when the translucent lampshade 10 and the base 20 are combined, a waterproof gasket 14 is installed between the bottom 122 of the side translucent portion 12 and the outer ring 23 of the base 20, and the bottom 122 of the side translucent portion 12 of the translucent lampshade 10 is provided with a plurality of screw holes 15, and the outer ring 23 of the base 20 is correspondingly provided with a plurality of screw holes 26, for locking a plurality of external screws 16 from each screw hole 26 of the outer ring 23 into the corresponding screw hole 15 of the bottom 122 of the side translucent portion 12, such that the waterproof gasket 14 is tightly clamped between the bottom 122 of the side translucent portion 12 and the outer ring 23 of the base 20 to seal the translucent lampshade 10 with the base 20 in order to prevent moisture infiltration.

In FIGS. 2 and 6 to 8, the bottom surface 211 of the accommodating slot 21 is provided for installing a group of positioning components 200, such that the base 20 can be fixed to the ground or a plane through the positioning component 200. In an embodiment, the positioning component 200 includes a positioning plate 70 in form of a sheet, and a plug-in part 80 detachably installed to the bottom surface 211 of the accommodating slot 21.

In the figures, the periphery of the bottom surface 211 of the accommodating slot 21 of the base 20 is provided with two hooks 27, and the positioning plate 70 is correspondingly provided with two arc grooves 71 which are used for the purpose of deviating and positioning after the two hooks 27 are embedded into the two arc grooves 71 respectively, and allowing the positioning plate 70 to be detachably installed to the bottom surface 211 of the accommodating slot 21. In addition, the periphery of the positioning plate 70 is provided with a plurality of positioning holes 72 for passing through an external positioning part (such as a screw, not shown in the figure) and then fixing it to a plane, such as a wall, etc.

Figure 7:
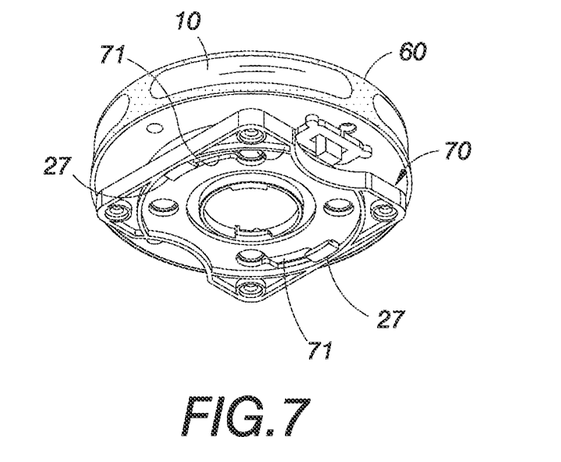
FIG. 7 is a schematic view of the assembly of an outdoor lamp and a positioning plate of the present disclosure.
Figure 8:
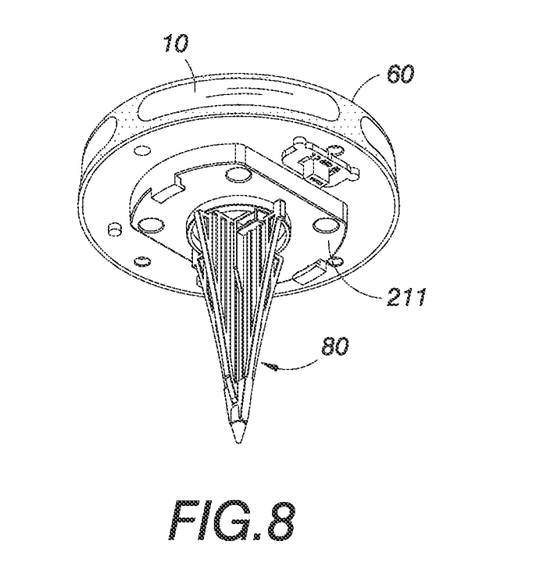
FIG. 8 is a schematic view of the assembly of an outdoor lamp and a plug-in part of the present disclosure.

In an embodiment, the plug-in part 80 can be implemented with two implementation modes, one of the them is a sharp conical part 82 in the form of an inversely tapered cross cone including a top with a mounting portion 81 and a bottom pluggable into the ground or other planes. In conjunction with the structure of the plug-in part 80, the center of the positioning plate 70 is provided with a round hole 73, and the center of the bottom surface 211 of the accommodating slot 21 of the base 20 is correspondingly provided with a mounting slot 28, such that the mounting portion 81 of the plug-in part 80 can pass through the round hole 73 and can be detachably installed to the mounting slot 28 or directly installed into the mounting slot 28. Therefore, the positioning plate 70 and the plug-in part 80 can be simultaneously or changeably combined with the bottom surface 211 of the base 20.

In this embodiment of the plug-in part 80, the mounting portion 81 includes two buckle slots 811, the inner periphery of the mounting slot 28 of the bottom surface 211 of the base 20 is provided with two elastic protruding buckles 281, and the two elastic protruding buckles 281 are buckled and positioned with the two buckle slots 811 to stably combine the plug-in part 80 and the outdoor lamp 100 and prevent them from detaching from each other.

In another embodiment, the plug-in part 80A is also a sharp conical part 82A in the shape of an inversely tapered cross cone and having a bottom pluggable into the ground or a plane. The difference of this embodiment from the previous embodiments is that the top of the plug-in part 80A is provided with a plurality of plug-in posts 83, the positioning plate 70 is provided with a plurality of through holes 74, the bottom surface 211 of the accommodating slot 21 of the base 20 is correspondingly provided with a plurality of plug holes 29, and the plurality of plug-in posts 83 of the plug-in part 80 can be passed through the through holes 74 and detachably installed in the plug hole 29.

Figure 9:
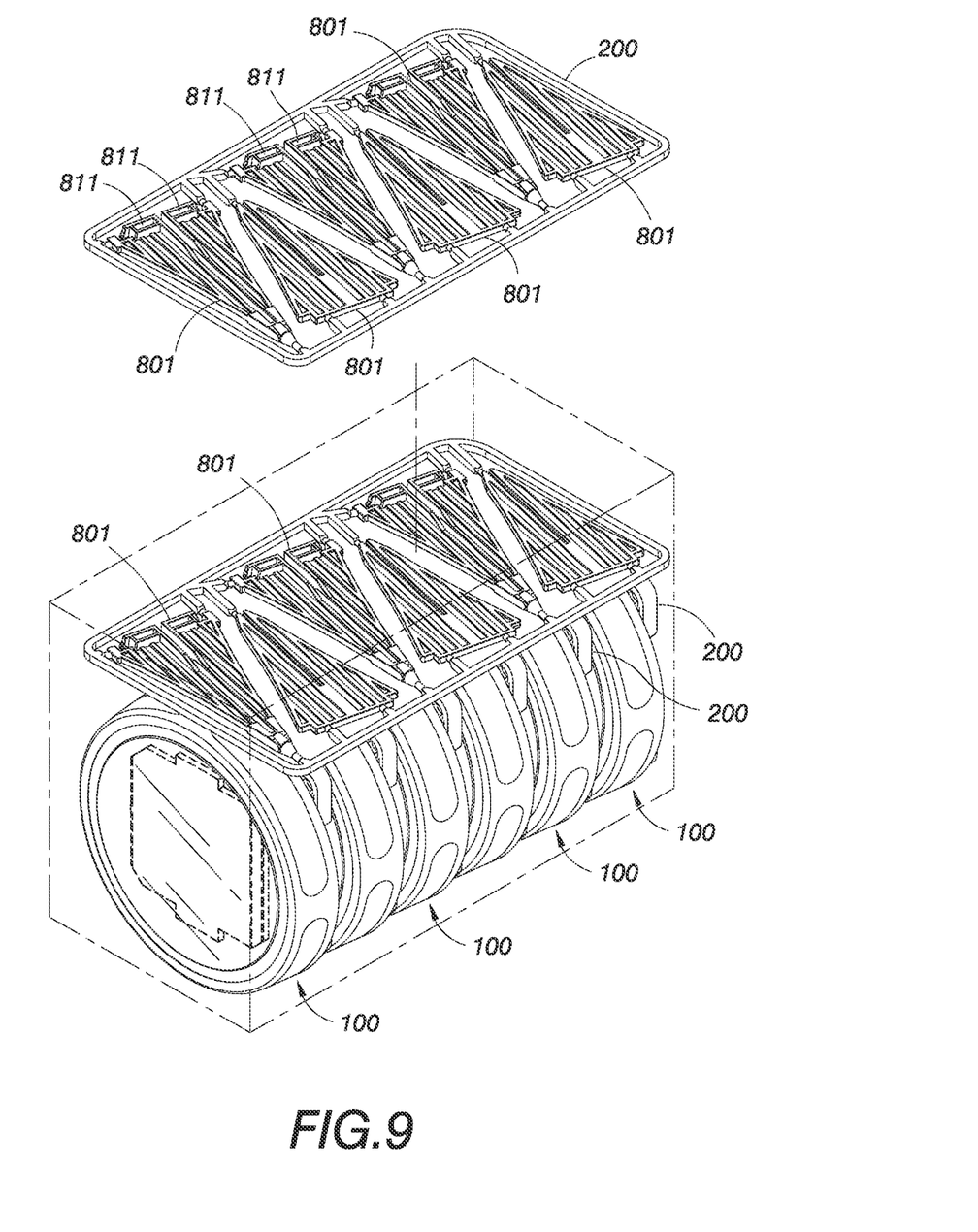
FIG. 9 is a schematic view of the package of an outdoor lamp and a positioning component of the present disclosure.

In different embodiments, the plug-in part 80, 80A can be integrally formed, which is especially suitable for the occasion of displays and can avoid loss or missing. Although the integrally formed plug-in part 80, 80A has the advantage of saving assembly manpower, but the integrally formed part has a larger volume which will incur higher packaging and transportation costs, so that the plug-in part 80 can also be formed by detachably assembling two triangular sheets 801 with vertices pointing downward as shown in FIG. 9, wherein a plurality of triangular sheets 801 can be set in the same mold during manufacturing and packaged with the plurality of outdoor lamps 100 altogether in the same package to reduce packaging and transportation costs.

While the disclosure has been described by means of specific embodiments, numerous modifications and variations could be made thereto by those skilled in the art without departing from the scope and spirit of the disclosure as set forth in the claims.

What is claimed is:

1. An outdoor solar disc lamp, comprising:
    a translucent lampshade, having a top translucent portion, and a side translucent portion extended downwardly from a periphery of the top translucent portion, wherein the side translucent portion has a bottom and an inner side;
    a base, comprising an accommodating slot formed at a center region of the base, the accommodating slot having a bottom surface configured for installing a positioning component, such that the base can be coupled to the ground or an installation surface through the positioning component; a fixed portion extended outwardly from a periphery of the accommodating slot, and having an outer ring provided for fixing the bottom of the side translucent portion of the translucent lampshade, and the fixed portion comprising a fixed platform disposed between the outer ring and the accommodating slot;
    a battery, installed in the accommodating slot, and having a partition disposed above the battery, a height of the partition being higher than the fixed platform of the fixed portion of the base;
    a solar panel, installed on the partition of the battery, and disposed under a center region of the top translucent portion of the translucent lampshade, a spacing disposed between a periphery of the solar panel and an inner side of the side translucent portion; and
    an annular light panel, electrically coupled to the solar panel and the battery, and fixed onto the fixed platform and between the inner side of the side translucent portion and the accommodating slot, the annular light panel having a height lower than the solar panel, and the annular light panel comprising a plurality of LEDs thereon, such that the LEDs are disposed adjacent a lower portion of the side translucent portion below a center region of the side translucent portion so that when the plurality of LEDs emits light, the light of the LEDs upwardly passes through the spacing between the solar panel and the side translucent portion and penetrates through the top translucent portion of the translucent lampshade and laterally passes through the side translucent portion of the translucent lampshade.

2. The outdoor solar disc lamp according to claim 1, wherein the top translucent portion of the translucent lampshade comprises an embossed line disposed above the spacing and provided for diffusing the light upward, and the translucent lampshade further comprises a frame installed around the periphery of the top translucent portion, the side translucent portion having an outer side opposite to the inner side, and the outer periphery of the frame extends downwardly to the outer side of the side translucent portion and has a plurality of translucent holes.

3. The outdoor solar disc lamp according to claim 1, wherein the accommodating slot is a recess in a middle portion of the base, the battery is stacked in the accommodating slot, and the fixed portion is formed by extending outwardly an upper edge of the recessed accommodating slot.

4. The outdoor solar disc lamp according to claim 3, wherein a periphery of the partition of the battery is extended downwardly to cover a periphery of the battery, and the partition comprises a plurality of terminals electrically coupled to the annular light panel, the battery and the solar panel.

5. The outdoor solar disc lamp according to claim 1, further comprising a switch electrically coupled to the annular light panel.

6. The outdoor solar disc lamp according to claim 1, wherein the fixed platform of the base comprises a plurality of positioning ribs upwardly protruded from the fixed platform and provided for positioning the annular light panel.

7. The outdoor solar disc lamp according to claim 1, further comprising a waterproof gasket installed between the bottom of the side translucent portion of the translucent lampshade and the outer ring of the base.

8. The outdoor solar disc lamp according to claim 7, further comprising a plurality of screw holes formed between the bottom of the side translucent portion of the translucent lampshade and the outer ring of the base and provided for engaging a plurality of external screws from each screw hole of the outer ring in a direction from inside to outside into the corresponding screw holes at the bottom of the side translucent portion, such that the waterproof gasket is clamped between the bottom of the side translucent portion and the outer ring of the base.

9. The outdoor solar disc lamp according to claim 1, wherein the positioning component comprises a positioning plate and a plug-in part detachably installed to the bottom surface of the accommodating slot; a plurality of hooks are installed to and protruded from a periphery of the bottom surface of the accommodating slot, and the positioning plate comprises a plurality of arc grooves provided for engaging the plurality of hooks of the base, such that the positioning plate is detachably connectable to the bottom surface of the accommodating slot, and a periphery of the positioning plate is provided with at least a positioning hole for fixing an external positioning part onto the installation surface after passing the external positioning part through the positioning hole.

10. The outdoor solar disc lamp according to claim 9, wherein a central position of the positioning plate is provided with a hole, a middle of the bottom surface of the accommodating slot of the base is concavely formed with a mounting slot, the plug-in part is in the shape of an inversely tapered cross cone, and comprises a mounting portion disposed at a top of the plug-in part, and a conical part disposed at a bottom of the plug-in part and pluggable into the ground or the installation surface, and the mounting portion is passed through the hole and detachably installed in the mounting slot.

11. The outdoor solar disc lamp according to claim 10, wherein an inner periphery of the mounting slot formed on the bottom surface of the base is provided with two elastic protruding buckles, and the mounting portion of the plug-in part is provided with two buckle slots configured to engage with the two elastic protruding buckles.

12. The outdoor solar disc lamp according to claim 10, wherein the plug-in part is integrally formed or formed by detachably assembling two triangular sheets in a staggered manner and with vertices pointing downward.

13. The outdoor solar disc lamp according to claim 9, wherein the positioning plate is provided with a plurality of through holes, a bottom surface of the accommodating slot is correspondingly provided with a plurality of plug holes, the plug-in part is in the shape of an inversely tapered cross cone, and comprises a plurality of plug-in posts disposed at a top of the plug-in part, passed through the through holes, and detachably installed in the plug holes, and a conical part disposed at the bottom of the plug-in part and pluggable into the ground or the installation surface.

14. The outdoor solar disc lamp according to claim 13, wherein the plug-in part is integrally formed or formed by detachably assembling two triangular sheets in a staggered manner and with vertices pointing downward.

\* \* \* \* \*